United States Patent [19]

Wkössner

[11] Patent Number: 4,560,041
[45] Date of Patent: Dec. 24, 1985

[54] SHOCK ABSORBER UNIT WITH TEMPERATURE COMPENSATION

[75] Inventor: Felix Wkössner, Schweinfurt, Fed. Rep. of Germany

[73] Assignee: Fichtel & Sachs AG, Schweinfurt, Fed. Rep. of Germany

[21] Appl. No.: 636,588

[22] Filed: Aug. 1, 1984

[30] Foreign Application Priority Data

Aug. 5, 1983 [DE] Fed. Rep. of Germany ....... 3328347

[51] Int. Cl.$^4$ ............................................. F16F 9/44
[52] U.S. Cl. ................................................... 188/278
[58] Field of Search ............... 188/276, 277, 278, 315, 188/322.13, 322.19

[56] References Cited

U.S. PATENT DOCUMENTS

| 1,890,580 | 12/1932 | Kelley | 188/278 |
| 1,897,873 | 2/1933 | Timson | 188/277 |
| 2,334,115 | 11/1943 | Meredith | 188/278 |
| 3,791,494 | 2/1974 | McNally | 188/277 |

FOREIGN PATENT DOCUMENTS

| 3131262 | 2/1983 | Fed. Rep. of Germany . |
| 472991 | 4/1979 | United Kingdom . |
| 2103334 | 2/1981 | United Kingdom . |
| 1397635 | 3/1982 | United Kingdom . |

Primary Examiner—Duane A. Reger
Attorney, Agent, or Firm—Toren, McGeady, Stanger, Goldberg & Kiel

[57] ABSTRACT

The characteristics of a double-tube shock absorber are variable in response to temperature variations as a result of viscosity variations of the damping liquid. In view of compensating for such variations of the damping characteristics the central cavity is connected with the annular compensation chamber by a throttled flow cross-sectional area. This throttled flow cross-sectional area is variable in response to ambient temperature. In view of varying the flow cross-sectional area a control bar is provided on the outer surface of the cylinder of the shock absorber. This control bar extends substantially in axial direction of the shock absorber and is fixed to the cylinder at a location remote from the location of the throttled flow cross-sectional area. The other end of the control bar cooperates with the flow cross-sectional area and effects the variation thereof.

15 Claims, 9 Drawing Figures

SHOCK ABSORBER UNIT WITH TEMPERATURE COMPENSATION

BACKGROUND OF THE INVENTION

In a double-tube shock absorber such as frequently used in compression struts of motor vehicles the damping characteristics are dependent on the flow resistance which is opposed to the outflow of a body of damping liquid through a throttled flow cross-sectional area. When the temperature is raised the viscosity of the damping liquid is reduced. So the damping effect is also reduced. By simultaneously reducing the flow cross-sectional area the resistance to the outflow can be increased such that the reduction in resistance due to the reduced viscosity is compensated for.

STATEMENT OF THE PRIOR ART

In German Offenlegungsschrift No. 31 31 262*) flow cross-sectional area is defined by a gap between opposed ends of a gapped ring member which is located near the transition between the cylinder and the piston rod guiding and sealing unit. The manufacturing and assembling of the gapped ring member within the shock absorber is relatively complicated and time-consuming. Moreover, the width of the gap is highly responsive to deviations of the size of the ring member and to deviations in size of the support faces supporting the ring member.

*) corresponds to U.S. patent application Ser. No. 403,051 and French patent application No. 82.14 026.

OBJECT OF THE INVENTION

It is the object of the present invention to have a shock absorber unit in which the control member can be easily manufactured and assembled with the shock absorber without the risk of varying characteristics between different items of the shock absorber.

SUMMARY OF THE INVENTION

A shock absorber to be used particularly as an insert for a compression strut comprises a cylinder having an axis and first and second ends, respectively. A cavity is defined within the cylinder. A piston rod guiding and sealing unit is provided adjacent the first end of the cylinder. A piston unit within the cavity divides the cavity into two working chambers which are interconnected by at least one piston passage. A piston rod is connected to the piston unit within the cavity and extends through the guiding and sealing unit. A container having first and second ends adjacent the first and second ends of the cylinder, respectively, surrounds the cylinder. A compensation chamber is defined between the container and the cylinder. The container is closed at its second end by a bottom wall. A bottom valve unit is provided adjacent the second ends of the cylinder and the container. This bottom valve provides a flow passage between the cavity and the compensation chamber. The cavity is filled with a damping liquid. The compensation chamber is partially filled with damping liquid and partially filled with gas. A by-pass is provided between the cavity and the compensation chamber. This by-pass is defined by a throttling flow cross-sectional area. The throttling flow cross-sectional area is controlled by a temperature-responsive control member.

The temperature-responsive control member is in accordance with this invention established by a control bar arranged at the outer side of the cylinder. This control bar extends substantially in axial direction of the cylinder. The control bar is fixed with respect to the cylinder at a location remote from the location of the throttling flow cross-sectional area and is axially slidable with respect to the cylinder in the range between the fixing location and the location of the throttling flow cross-sectional area.

The control bar is a member which can be easily manufactured and assembled with the remaining parts of the shock absorber. So manufacturing costs are reduced. The control bars can be manufactured with constant lengths within close tolerances.

Moreover, the control bar requires only little space between the cylinder and the container so that the control bar of this invention is of particular importance in those frequent cases in which the radial distance between the cylinder and the container is small. There is no risk that the movement of the control bar in response to temperature variations is hindered by adjacent parts of the shock absorber of this invention. The flow of the damping liquid is not disturbed by the presence of the control bar; this is of particular interest at low temperatures when the viscosity of the damping liquid is high.

The control bar is preferably made of plastic material like polyethylene, polyacetale or polyamide.

In order to maintain contact between the control bar and the outer side of the cylinder even in cases in which the control bar has a considerable length and a small cross-sectional area, a support system may be provided which supports the control bar and permits axial movement of the control bar with respect to the cylinder in the range between the fixing location and the location of the throttling flow cross-sectional area.

The function of the support system can also be fulfilled by the container particularly with embodiments of small radial distance between the cylinder and the container.

The support system may comprise at least one elongated guide part fixed with respect to the cylinder and maintaining the control bar in a substantially straight form.

Further the support system may comprise a guide clip surrounding the cylinder along at least part of its periphery. This guide clip may be connected to the guide part between the tow ends thereof.

The guide part may be formed from a wire or from a flat material strip. The wire and the flat material strip may be of metallic material.

In order to improve the guide function of the guide part, the guide part may be received by a reception groove of the control bar. In view of an exact control of the temperature dependency the control bar is biased towards the outer side of the cylinder at least within a region adjacent the location of the throttling flow cross-sectional area. Under normal circumstances the contact of the control bar with the cylinder is, thereby, maintained. Only under exceptionally high damping situations the control bar may be elastically lifted from the cylinder and, thereby, fulfil the additional function of the excess pressure valve.

In order to prevent wear of the control bar by jets of damping liquid the control bar is provided with a reinforcement member at an end portion thereof. The reinforcement member cooperates with the throttling flow cross-sectional area. The reinforcement member is preferably formed by an elastic spring metal piece which may be provided with fastening tabs fastening it on the control bar. The elastic spring metal piece may either be planar or curved. The curvature has preferably a radius smaller than the outer radius of the cylinder so that by radial pressure the spring metal piece is brought into full face contact with the outer surface of the cylinder.

The contact of the spring metal piece with the cylinder can further be improved by a recess of the control bar such that the spring metal piece is in contact with the control bar only in two limited areas spaced from each other.

Moreover, by the recess in the control bar the jets passing through the throttling flow cross-sectional area can be broken and prevented from foaming the liquid column within the reservoir chamber. This function can be improved still by extending the recess along the control bar such as to open into the compensation chamber at a location below the surface level of the liquid within the compensation chamber.

Preferably, the by-pass is provided adjacent the first ends of the cylinder and the container, respectively.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The invention will be explained in greater detail below by reference to examples of embodiment. In detail.

DESCRIPTION OF THE PREFERRED EMBODIMENT

Figure 1:
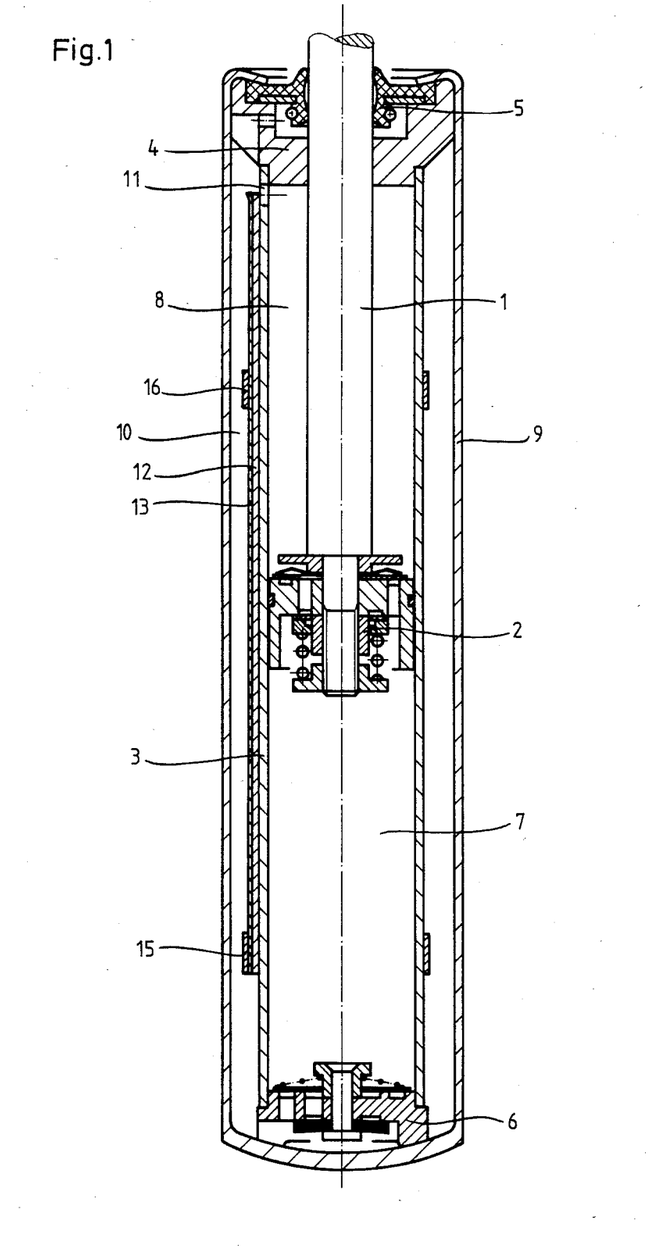
FIG. 1 shows a double-tube shock absorber in longitudinal section, with a control bar arranged on the cylinder.
Figure 3:
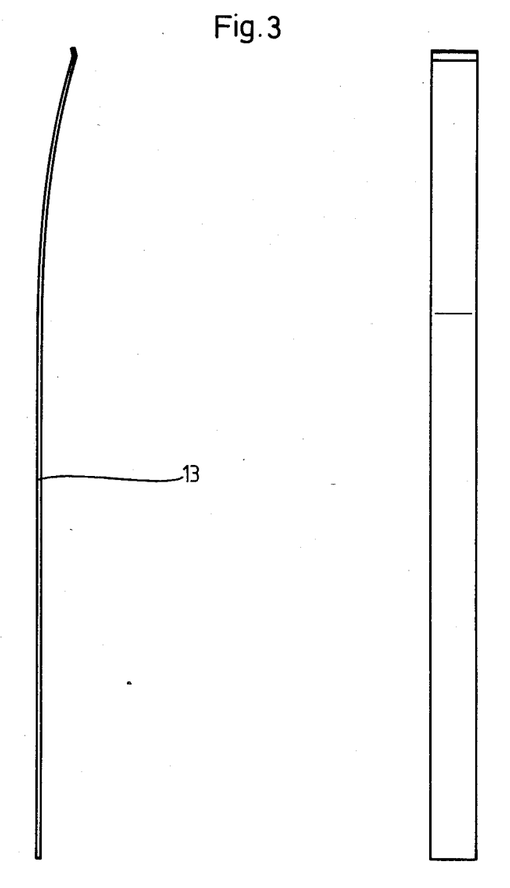
FIG. 3 shows a guide part for the control bar consisting of a flat material strip.

Temperature-dependently acting control devices for flow cross-sections are used to compensate for the greatly temperature-dependent viscosity behaviour of the oils used for hydraulic damping shock absorbers. Since the damping force increases greatly specifically in coldness, it is desirable that an additional cross-section is then cleared. A temperature-dependently acting compensation of the damping forces of a shock absorber is illustrated in FIG. 1. In this double-tube shock absorber a piston 2 connected with a piston rod 1 is axially movably arranged in the cylinder 3, the piston rod 1 being guided in the cylinder by means of the piston rod guiding and sealing unit 4 and sealed off to the exterior by a piston rod seal 5. The cylinder 3 is centred in a container 9 by the piston rod guiding and sealing unit 4 and a bottom valve unit 6. Between the wall of the cylinder 3 and the wall of the container 9 there is an annular compensation chamber which is filled partially with damping liquid and partially with gas. This compensation chamber 10 is to compensate for the variable piston rod volume within the cylinder 3. The interior of the cylinder 3 is divided by the piston unit 2 into two working chambers 7 and 8, the lower working chamber 7 being connected through the bottom valve unit 6 with the compensation chamber 10, while the upper working chamber 8 is connected to the compensation chamber 10 through a throttling flow cross-sectional area 11 which is variable by means of a control bar 12 of temperature-dependently variable length. This control bar 12 extends in the axial direction of the shock absorber and is of relatively narrow formation, so that even in the case of a very narrow compensation chamber 10 the damping liquid flowing through the throttling flow cross-sectional area 11 can flow through the compensation chamber without hindrance. At its lower end the control bar 12 is secured on the cylinder 3 by means of a retaining clip 15, while an elongated guide part 13 consisting of spring steel lies in a reception groove of the control bar 12 and prevents deviation or buckling out of the control bar 12. This guide part 13, as shown in FIG. 3, is provided with a bent-forward end which in the region of the throttling flow cross-sectional area 11 exerts a radially acting pressure application force upon the control bar 12 and presses the latter against the outer side of the cylinder 3. Especially in case of a relatively wide compensation chamber 10 it is expedient to guide the control bar 12 and the guide part 13 by means of a guide clip 16, and this guide clip 16 does not hinder the axial slidability of the control bar 12. In the case of a narrow compensation chamber 10 it is readily possible for the guide part 13 to support itself on the inner side of the container 9, so that the guide clip 16 can be omitted.

Figure 2:
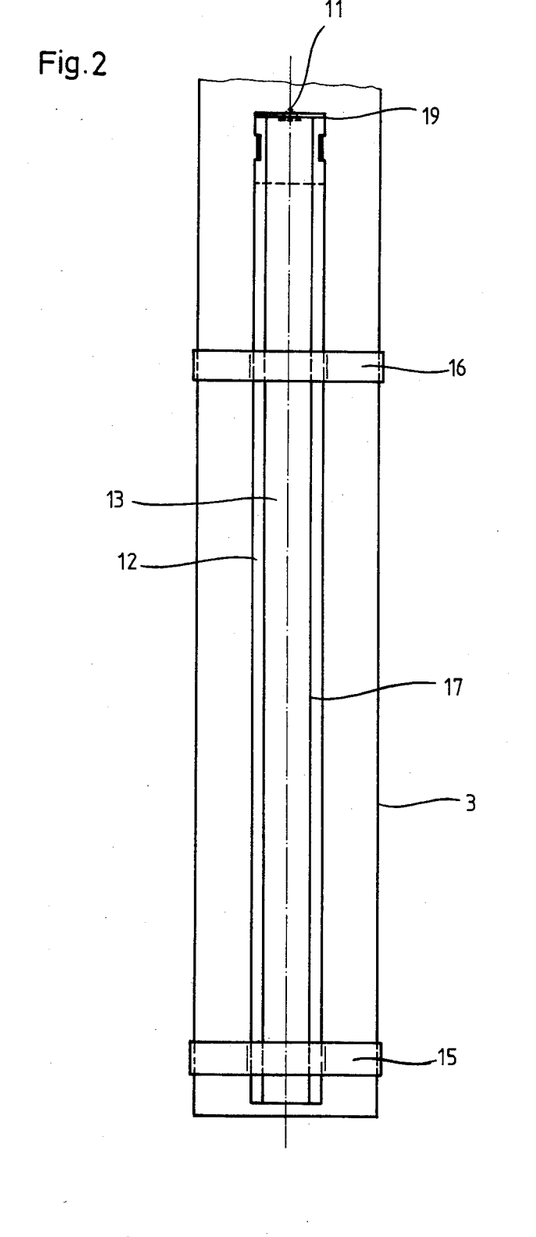
FIG. 2 shows a view of an assembly unit consisting of cylinder and control bar.
Figure 4:
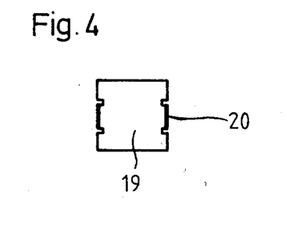
FIG. 4 shows a reinforcement member of the control bar in planar view.
Figure 5:
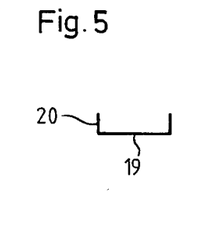
FIG. 5 shows an elevation of the reinforcement member of FIG. 4.

In FIG. 2 there is shown an elevation of a unit consisting of cylinder 3, control bar 12 and guide part 13. The control bar 12 and the guide part 13 are firmly connected at the lower end with the cylinder 3 by means of the retaining clip 15. To receive the guide part 13 the control bar 12 comprises a reception groove 17, while at the upper end of the control bar 12 there is arranged a curved spring metal piece 19 serving as a reinforcement member for the control bar 12. The upper edge of the reinforcement member cooperates with the throttling flow cross-sectional area provided in the cylinder 3. The guide part 13 is supported under radial prestress in the guide clip 16 such that the curved spring metal piece 19 is biased against the outer surface of the cylinder 3. So the spring metal piece is adapted to the curvature of the cylinder. The curved spring metal piece 19 is a wear-resistant component and possesses, as shown in FIGS. 4 and 5, fastening tabs 20 which engage in corresponding apertures of the control bar 12.

Figure 6:
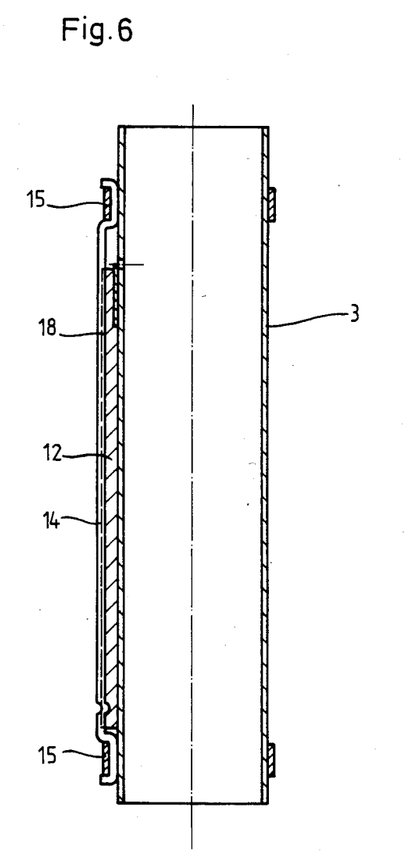
FIG. 6 shows in longitudinal section an assembly unit consisting of the cylinder, the control bar and the guide part, the guide part being formed from wire.
Figure 7:
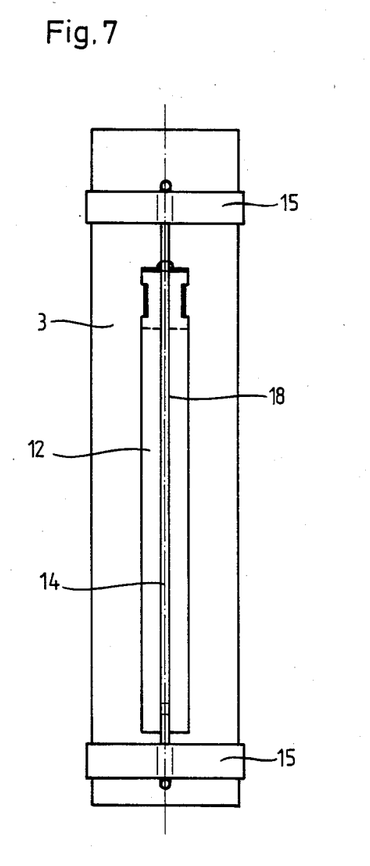
FIG. 7 shows an elevation of the assembly unit as shown in FIG. 6.

The form of embodiment according to FIGS. 6 and 7 differs from that according to FIGS. 1 and 2 essentially in that the control bar 12 comprises a guide part 14 formed from a wire, which is arranged in a reception groove 18. This guide part 14 has a coefficient of thermal expansion corresponding to that of the cylinder 3, so that this guide part 14 can be secured on the cylinder 3 by means of a retaining clip 15 at both ends. At the lower end the control bar 12 is axially fixed by means of a nose situated in the guide part 14; the upper end of the control bar 12 can move in axial direction. Buckling out or deviation of the control bar 12 in relation to the guide part 14 is prevented by the fact that the guide part 14 is arranged in a reception groove 18 of the control bar 12.

Figure 8:
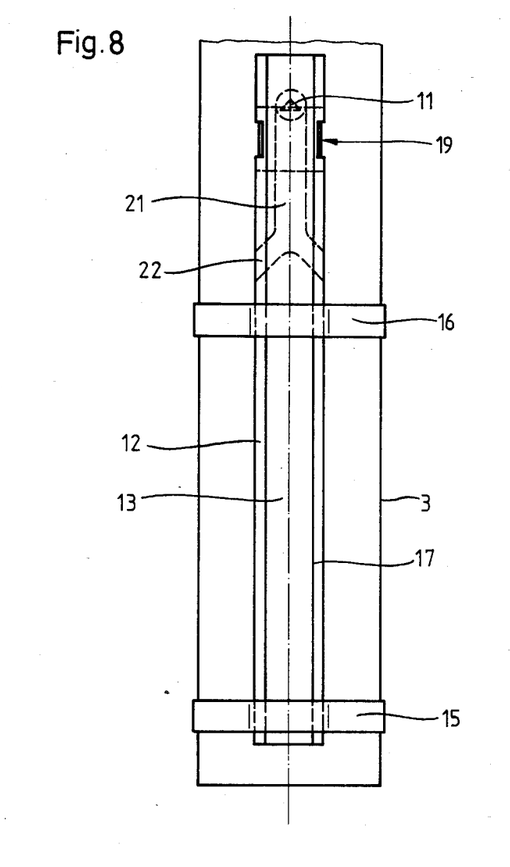
FIG. 8 shows an elevation of a modified embodiment in which the control bar is provided with a recess and a passage connecting the throttled cross-section with the sump of liquid in the compensation chamber.
Figure 9:
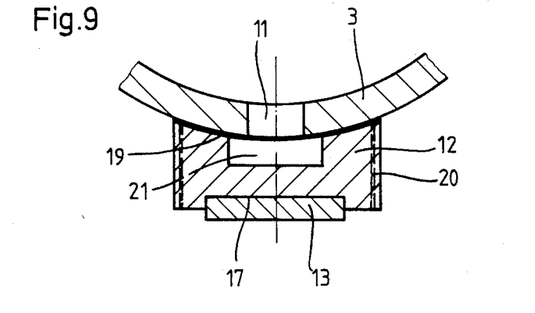
FIG. 9 shows a cross-section through the embodiment according to FIG. 8 in the region of the throttled flow cross-section, in enlarged representation.

In the form of embodiment as shown in FIG. 8 the control bar 12 fully covers the throttling flow cross-sectional area 11 located in the cylinder 3. The curved spring metal piece 19 is secured beneath the upper end portion of the control bar 12, while a recess 21 extending in the longitudinal direction terminates above the control edge of the curved spring metal piece 19 and is formed to extend downwards in the axial direction. Passage openings 22 lying beneath the damping liquid surface level open into the recess 21. With this form of embodiment the object is achieved that if the throttled flow cross-sectional area 11 lies above the damping liquid surface level the damping liquid issuing from the working chamber enters the compensation chamber beneath the damping liquid surface level, and thus foaming is avoided. For clarification a cross-section in the region of the throttling flow cross-sectional area is shown in enlarged representation in FIG. 9. The recess 21 is defined by the curved spring metal piece 19 and the control bar 12. This recess 21 forms abutment faces on both sides thereof for the curved spring metal piece 19, so that the curved spring metal piece 19 is adapted exactly under radial force to the external contour of the cylinder 3; thus a satisfactory abutment and sealing effect of the curved spring metal piece 19 on the outer wall of the cylinder 3 is achieved. By means of the fastening tabs 20 the curved spring metal piece 19 is made fast on the control bar 12, while the guide part 13 is arranged in the reception groove 17.

Since in all embodiments the control bar 12 can be made relatively long, a temperature variation effects a relatively great variation of the length of the control bar 12. The throttling flow cross-sectional area 11 will be cleared more or less according to the temperature. At high temperature the throttling flow cross-sectional area 11 will be closed by the control bar 12, while at very low temperature the throttling flow cross-sectional area 11 is fully opened. A compensation of the greatly temperature-dependent viscosity behaviour of the damping liquid is obtained by the triangular form of the throttling flow cross-sectional area 11 and by the variation of length of the control bar 12, which consists of a material with high coefficient of thermal expansion.

While specific embodiments of the invention have been shown and described in detail to illustrate the application of the inventive principles, it will be understood that the invention may be embodied otherwise without departing from such principles.

The reference numbers in the claims are only used for facilitating the understanding and are by no means restrictive.

What is claimed is:

1. A shock absorber unit to be used particularly as an insert for a compression strut comprising
   a cylinder (3) having an axis and first and second ends, respectively, and defining a cavity (7, 8) therein;
   a piston rod guiding and sealing unit (4, 5) adjacent said first end of said cylinder (3);
   a piston unit (2) within said cavity (7, 8) dividing said cavity (7, 8) into two working chambers (7; 8) and being provided with at least one piston passage connecting said working chambers (7; 8);
   a piston rod (1) connected to said piston unit (2) within said cavity (7, 8) and extending through said guiding and sealing unit (4, 5);
   a container (9) having first and second ends, respectively, adjacent said first and second ends of said cylinder (3), respectively, and surrounding said cylinder (3) such as to define a compensation chamber (10) outside said cylinder (3), said container (9) being closed at its second end by a bottom wall;
   a bottom valve unit (6) adjacent said second ends of said cylinder (3) and said container (9) providing a flow passage between said cavity (7, 8) and said compensation chamber (10);
   said cavity (7, 8) being filled with a damping liquid;
   said compensation chamber (10) being partially filled with said damping liquid and partially filled with gas;
   means defining at least one by-pass between said cavity (7, 8) and said compensation chamber (10), said by-pass defining a throttling flow cross-sectional area (11), said throttling flow cross-sectional area (11) being controlled by a temperature-responsive control member (12);
   said temperature-responsive control member (12) being a control bar (12) arranged on the outer side of the cylinder (3) and extending substantially in the axial direction of said cylinder (3), said control bar (12) being fixed with respect to said cylinder (3) at a location (15) remote from the location of said throttling flow cross-sectional area (11) and being axially slidable with respect to said cylinder (3) in the range between said fixing location (15) and the location of said throttling flow cross-sectional area (11).

2. A shock absorber unit as set forth in claim 1, wherein said control bar (12) is made of plastic material like polyethylene, polyacetale or polyamide.

3. A shock absorber unit as set forth in claim 1, wherein a support system (16, 13) is maintaining contact between said control bar (12) and the outer side of said cylinder (3), said support system permitting axial movement of said control bar (12) with respect to said cylinder (3) in the range between said fixing location (15) and the location of said throttling flow cross-sectional area (11).

4. A shock absorber unit as set forth in claim 3, wherein said support system (16, 13) comprises at least one elongated guide part (13) fixed with respect to said cylinder (3) and maintaining said control bar (12) in a substantially straight form.

5. A shock absorber unit as set forth in claim 3, wherein said support system (16, 13) comprises a guide clip (16) surrounding said cylinder (3) along at least part of its periphery.

6. A shock absorber unit as set forth in claim 4, wherein said guide part (14) is a component formed from a wire.

7. A shock absorber unit as set forth in claim 4, wherein said guide part (13) is a component manufactured from a flat material strip.

8. A shock absorber unit as set forth in claim 4, wherein said guide part (13, 14) is received by a reception groove (17, 18) of said control bar (12).

9. A shock absorber unit as set forth in claim 8, wherein said reception groove (17, 18) is provided on the side of said control bar (12) which is remote from said cylinder (3).

10. A shock absorber unit as set forth in claim 4, wherein said elongated guide part (13) is fastened to said cylinder (3) at a location (15) remote from the location of said throttling flow cross-sectional area (11) and engages said control bar (12) such as to bias said control bar (12) towards the outer side of said cylinder (3) at least within a region adjacent the location of said throttling flow cross-sectional area (11).

11. A shock absorber unit as set forth in claim 1, wherein said control bar (12) is provided with a reinforcement member (19) at an end portion thereof cooperating with said throttling flow cross-sectional area (11).

12. A shock absorber unit as set forth in claim 11, wherein said reinforcement member (19) is formed by an elastic spring metal piece which comprises fastening tabs (20) fastening it on the control bar (12).

13. A shock absorber unit as set forth in claim 12, wherein said control bar (12) comprises a recess (21) adjacent said location of said throttling flow cross-sectional area (11), said recess (21) being at least partially covered by said spring metal piece (19).

14. A shock absorber unit as set forth in claim 13, wherein said recess (21) is in fluid communication with a flow channel extending along said control bar and opening into said compensation chamber (10) at a location below the surface level of the liquid within said compensation chamber (10).

15. A shock absorber unit as set forth in claim 1, wherein said at least one by-pass (11) is provided adjacent said first ends of said cylinder (3) and said container (9), respectively.

* * * * *

UNITED STATES PATENT AND TRADEMARK OFFICE
CERTIFICATE OF CORRECTION

PATENT NO. : 4,560,041

DATED : December 24, 1985

INVENTOR(S) : Felix Wössner

It is certified that error appears in the above-identified patent and that said Letters Patent is hereby corrected as shown below:

On the title page:

In the heading of the Patent [75] should read as follows:

[75] Inventor: Felix Wössner, Schweinfurt, Fed. Rep. of Germany

Signed and Sealed this

Fifteenth Day of July 1986

[SEAL]

Attest:

DONALD J. QUIGG

Attesting Officer

Commissioner of Patents and Trademarks